United States Patent
Zile et al.

(10) Patent No.: US 12,008,053 B1
(45) Date of Patent: Jun. 11, 2024

(54) CORRELATING PERSONAL IDS TO ONLINE DIGITAL IDS

(71) Applicant: PulsePoint, Inc., New York, NY (US)

(72) Inventors: Jonathan Zile, New York, NY (US); Sudarshan Mahanubhav, Metuchen, NJ (US); Avikal Satle, Jersey City, NJ (US); Ezra Suveyke, Port Washington, NY (US); Jason Scheller, Chappaqua, NY (US)

(73) Assignee: PulsePoint, Inc., Newark, NJ (US)

( * ) Notice: Subject to any disclaimer, the term of this patent is extended or adjusted under 35 U.S.C. 154(b) by 221 days.

(21) Appl. No.: 17/463,125

(22) Filed: Aug. 31, 2021

Related U.S. Application Data

(60) Provisional application No. 63/072,876, filed on Aug. 31, 2020.

(51) Int. Cl.
| | | |
|---|---|---|
| G06F 16/00 | (2019.01) | |
| G06F 16/951 | (2019.01) | |
| G06F 16/957 | (2019.01) | |
| G06F 16/958 | (2019.01) | |
| G06N 5/04 | (2023.01) | |

(52) U.S. Cl.
CPC ........ *G06F 16/951* (2019.01); *G06F 16/9577* (2019.01); *G06F 16/958* (2019.01); *G06N 5/04* (2013.01)

(58) Field of Classification Search
CPC .. G06F 16/951; G06F 16/958; G06F 16/9577; G06N 5/04
See application file for complete search history.

(56) References Cited

U.S. PATENT DOCUMENTS

| | | | |
|---|---|---|---|
| 9,589,025 B2* | 3/2017 | Zhu | G06F 16/24578 |
| 10,681,168 B2* | 6/2020 | Berger | G06Q 50/01 |
| 11,126,696 B1* | 9/2021 | Srivastava | G16H 40/20 |
| 2010/0131835 A1* | 5/2010 | Kumar | G06Q 30/0269 |
| | | | 715/205 |
| 2010/0274815 A1* | 10/2010 | Vanasco | G06F 16/9024 |
| | | | 707/798 |
| 2011/0178885 A1* | 7/2011 | Xiong | G06Q 20/20 |
| | | | 705/16 |
| 2013/0073389 A1* | 3/2013 | Heath | G06Q 30/02 |
| | | | 705/14.54 |
| 2018/0089676 A1* | 3/2018 | Narasimhan | G06Q 30/0269 |
| 2018/0173871 A1* | 6/2018 | Toth | H04W 12/126 |
| 2022/0188699 A1* | 6/2022 | Matlick | G06F 21/6254 |

\* cited by examiner

*Primary Examiner* — Leslie Wong
(74) *Attorney, Agent, or Firm* — Potomac Law Group, PLLC; David E. Boundy

(57) ABSTRACT

A computer obtains records of multiple digital events from multiple vendors of digital event records, each digital event record having a digital ID of a user that initiated the respective digital event. A computer obtains at least one list of professional registry numbers of professionals in a profession. A computer classifies at least some portion of the digital event records and at least some internet web pages based on a standard taxonomical index. A computer identifies correlated identification data points among the digital event records and the professional registry records, and based on the taxonomic classification of pages and digital events, to infer a correlation between digital IDs from digital event records and actual physical identities of physical persons, and computing a parameter reflecting a degree of certainty of the inference.

18 Claims, 6 Drawing Sheets

| Data from NPI Registry 160 | |
|---|---|
| Source | Public Records |
| npi | 1706426431 122 |
| entry_type_code | 1 |
| provider_last_name | PERKINS 134 |
| first_name | LAUREN |
| middle_name | W |
| name_prefix_text | DR. |
| credential_text | MD |
| biz_mailing_line 1 | PO BOX 603725 |
| biz_mailing_line 2 | nan |
| biz_mailing_city | CHARLOTTE |
| biz_mailing_state | NC |
| biz_mailing_postcode | 282603725 |
| biz_mailing_country | US |
| biz_mailing_phone_no | 8285752625 |
| biz_mailing_fax_no | 8283502174 |
| practice_loc_addr_line_1 | 330 EMERSON LN |
| practice_loc_addr_city | ATHENS |
| practice_loc_addr_state | GA |
| practice_postcode | 306062152 |
| last_update_date | 5/9/2019 |
| provider_gender_code | M |
| provider_taxonomy code | 207K00000X 207K00000X |
| groups | Allopathic & Osteopathic |
| classification | Allergy & Immunology 136 |

| Record from Data Provider 1 162 | |
|---|---|
| pii_source | DMD |
| npi | 1706426431 122 |
| npihash 142 | e83df605300e6f2b9edf91a5 |
| email_1 132 | 9e5f1dda354dbd9e0dafe93c |
| email_2 | a25b2919e32de8c27779dab |
| email_3 | 665517804c1f64c28bd59bd |
| email_4 | b861413babf5816cfe6cdb8f |
| first_name | LAUREN |
| last_name | PERKINS 134 |
| group_specialty | Allergy and Immunology 136 |
| primary_specialty | Allergy (A) |
| secondary_specialty | Pulmonary Disease (PUD) |
| pref_addr_01 | 330 EMERSON LN |
| pref_addr_02 | |
| pref_city | ATHENS |
| pref_state | GA |
| pref_zip | 30606-2152 |
| work_addr_01 | 330 EMERSON LN |
| work_city | ATHENS |
| work_state | GA |
| work_zip | 30606-2152 |
| phone | 7066138500 |

| Record from Data Provider 2 162 | |
|---|---|
| pii_source | HM |
| npi | 1706426431 122 |
| npihash 142 | e83df605300e6f2b9edf91a5 |
| email_1 | 794c26eac018b3cc25f0fe2d |
| email_2 132 | 9e5f1dda354dbd9e0dafe93 |
| email_3 | a25b2919e32de8c27779da |
| email_4 | 7aa16b8561669097b9c411 |
| email_5 | 6728236b3ac2e1b663e637 |

| Record from Data Provider 3 162 | |
|---|---|
| npi | 1706426431 122 |
| npihash 142 | e83df605300e6f2b9edf91a5 |
| firstname | lauren |
| lastname | perkins 134 |
| emailaddress | lperkins@stmarysathens.org |
| address | 1230 baxter st |
| city | athens |
| state | ga |
| specialty | Internal medicine |
| category | Allergy Immunology Internal Medicine 136 |
| flag | a2 |

| Record from Data Provider 4 162 | |
|---|---|
| npi | 1706426431 122 |
| ListArray | PHM NY\Novartis Xolair; HEALIX\20191220 McNeil Zytec |
| Email | LWPERKINS330@BELLSOUTH.NET |

FIG. 1B

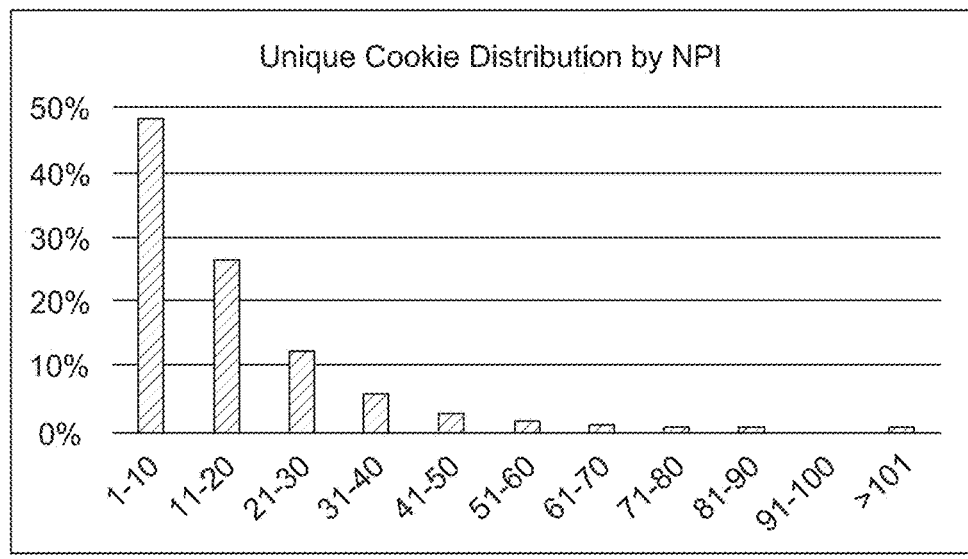
FIG. 3A
| day | 2/20/2020 |
|---|---|
| mean | 15.677 |
| median | 11 |
| Standard_dev | 20.014 |
| Max | 3079 |
FIG. 3B
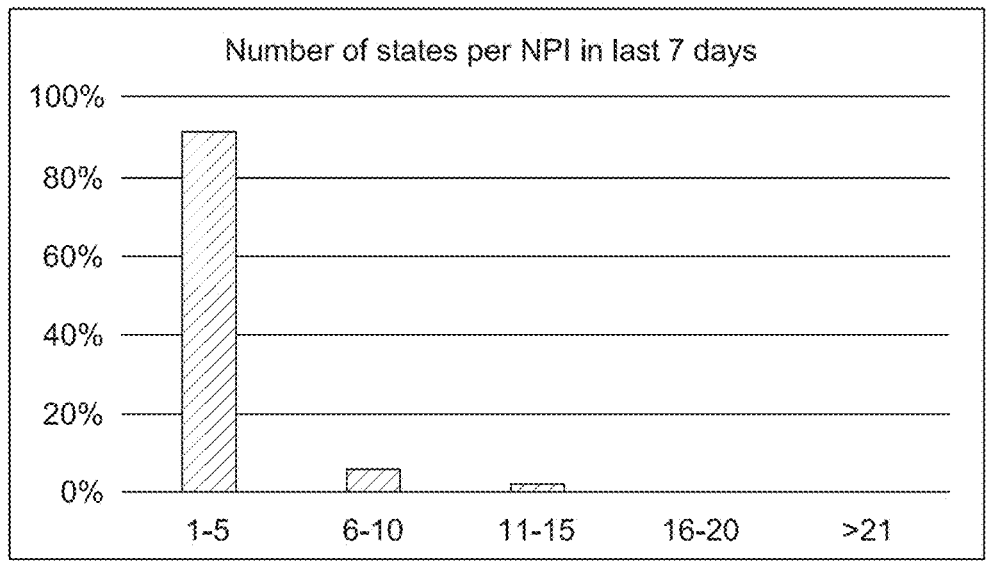
FIG. 3C

US 12,008,053 B1

CORRELATING PERSONAL IDS TO ONLINE DIGITAL IDS

BACKGROUND

This application is a non-provisional of U.S. Provisional App. Ser. No. 63/072,876, filed Aug. 31, 2020, titled "Correlating Personal IDs to Online Digital IDs," incorporated by reference.

This application relates to program control systems for transferring data among a plurality of spatially distributed computers or digital data processing systems via one or more communications media. In February 2020, Google announced that it would phase out support for third-party cookies from Chrome browsers, and in March 2021, further announced that Google would not build alternate identifiers to track individuals as they browse across the web, nor will Google use them in Google products. Web implementers are required to develop alternative mechanisms for the functions currently performed by third-party cookies—maintaining user's context information from visit to visit across multiple web sites over multiple days, identifying correlations of interest of the user to develop content recommendations, etc.

SUMMARY

In general, in a first aspect, the invention features a method, and a computer with instructions for performance of the method. A computer obtains records of multiple digital events from multiple vendors of digital event records, each digital event record having a digital ID of a user that initiated the respective digital event. A computer obtains at least one list of professional registry numbers of professionals in a profession. A computer classifies at least some portion of the digital event records and at least some internet web pages based on a standard taxonomical index. A computer identifies correlated identification data points among the digital event records and the professional registry records, and based on the taxonomic classification of pages and digital events, to infer a correlation between digital IDs from digital event records and actual physical identities of physical persons, and computing a parameter reflecting a degree of certainty of the inference.

Embodiments of the invention may include one or more of the following features. These features may be used singly, or in combination with each other. The correlating may consider at least three of a cookie value from a user's browser, IP address, user ID assigned by an onboarder, mobile device ID, mobile phone number, and email address. The correlating may consider at least four of a cookie value from a user's browser, IP address, user ID assigned by an onboarder, mobile device ID, mobile phone number, and email address. The identification of correlation may include identifying multiple digital IDs assigned by multiple sources that correspond, to high probability, to a single, identifiable individual. The list of professional registry numbers includes the NPI (National Provider ID) assigned by CMS (the Center for Medicare & Medicaid Services). The web pages and digital events may be taxonomically classified under at least two of SNOMED CT, the Medical Subject Headings (MeSH), the Unified Medical Language System (UMLS), and ICD-10.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 1B are data structure diagrams.
FIGS. 3A and 3C are histograms.
FIG. 3B is a table of numbers.

DESCRIPTION

The Description is organized as follows.
I. Overview
II. NPI Scoring
III. Correlating offline PII to cookie/device digital ID
IV. GPS data in verifying location of a user
   IV.A. Validation Application:
   IV.B. Real Time targeting using triangulation of GPS, Offline, and real time exchange data
V. Keyword expansion per condition
VI. Computer implementation

I. Overview

Figure 1A:
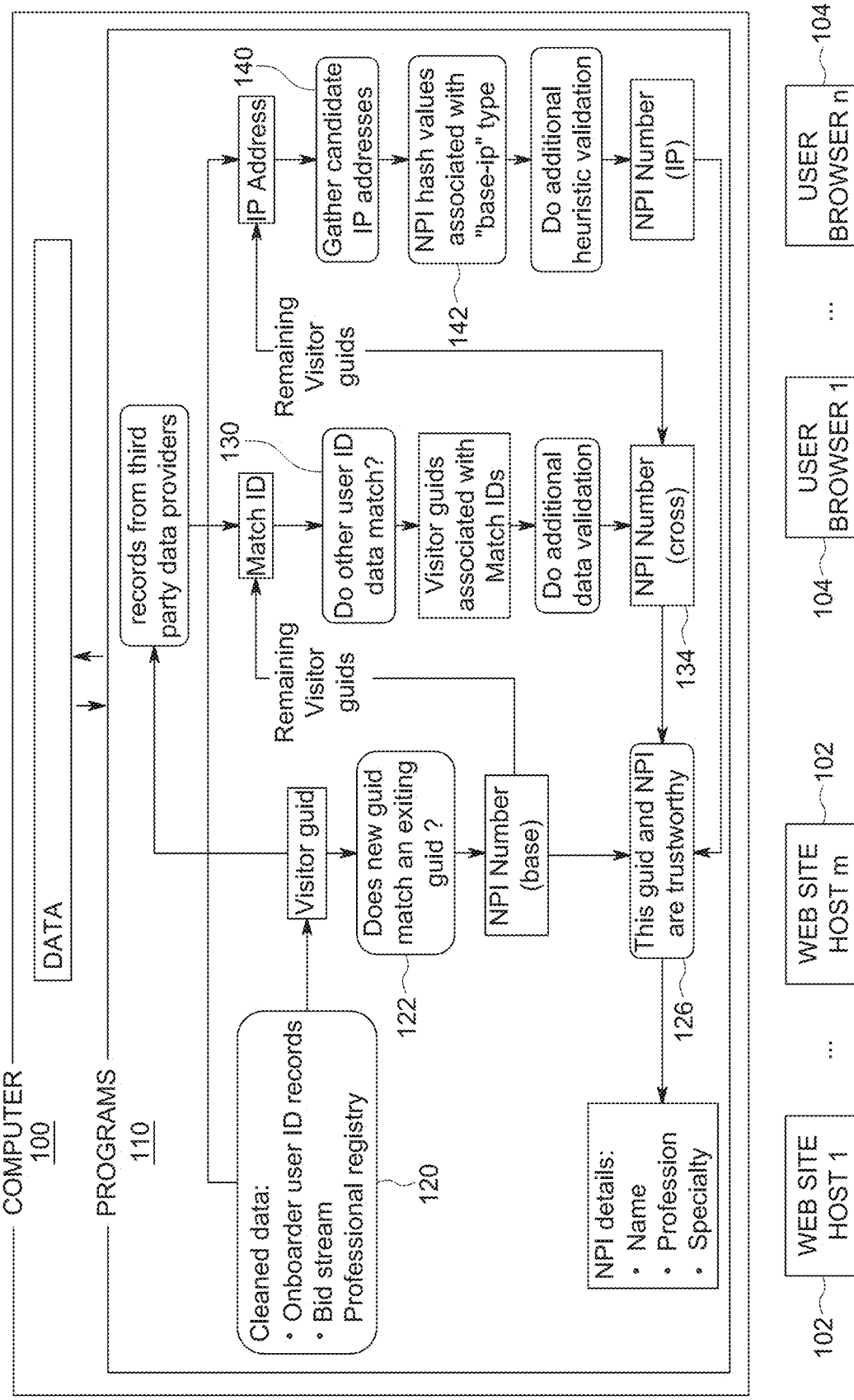
FIGS. 1A, 2A, 2B, and 2C are block diagrams of a computer system.

Referring to FIGS. 1A and 1B, as users browse the internet, various web sites assign digital ID numbers to users, so that repeat visitors to a single web site can be identified, and content provided to that user on future visits can be targeted to increase relevance to that user based on the user's past interactions with the web site. In some cases, targeting may be based on the user's visits to multiple web sites. This information is typically maintained on a user-blind basis—that is, the web site does not know the actual identity of the visitor, only that the digital ID is the same between two visits. Typically, a digital ID may be stored as a cookie on the user's browser, and IP address, a user ID assigned by an onboarder, or a mobile device ID. Different web sites may assign the same user different digital ID numbers. Conversely, various web sites acquire personal identification information (PII) about visitors, their actual names, email addresses, cell phone number, professional ID number, etc. In some professions, licensed professional individual are assigned unique numbers by licensing boards, such as the NPI (National Provider ID for doctors) assigned by CMS (the Center for Medicare & Medicaid Services). Computer system 100 is programmed with a combination of techniques to establish a linkage between a real person and that person's digital ID(s), and to consolidate the same person's digital IDs.

Referring to FIGS. 1A, 1B, 2A, 2B, and 2C, computer system 100 may improve content targeting. By identifying all visitor profiles and digital IDs of a person, and correlating those digital IDs to a personal identification, a content targeting system may discern more about the interests and activities of the person, and can choose more relevant content for delivery. For example, a visitor who has shown past interest in pregnancy, pain, or weight gain may be identified, and selected for specialized content. The targeting may be specialized and subspecialized by specific attributes of the person, such as medical condition for which treatment is sought, age or other demographic that may correlate to a health or disease state, or that form the practice of a physician. Computer system 100 may improve measurement, and may report to web site content providers increased-precision information about visitors, such as profession, location, name, professional ID, and the like, which in turn may be used by advertisers to accurately assess return on investment, and guide marketing spend. Correlation of various data may improve lifetime value analysis (projected revenue that a customer will generate during their lifetime after that customer is acquired) and similar long-term longitudinal analyses of user behavior. Computer system 100 may improve data from a digital onboarder (such as Screen6, Throtle, LiveIntent, and the like). An onboarder may have many cookies and digital IDs that are all thought to correlate to one person (even if that person is anonymous). Because computer system 100 has additional information, computer system 100 can disambiguate the onboarder's digital IDs, for example, to realize that they correspond to people in two different cities, or that are in different professions. Computer system 100 may filter out noise digital IDs.

Figure 2A:
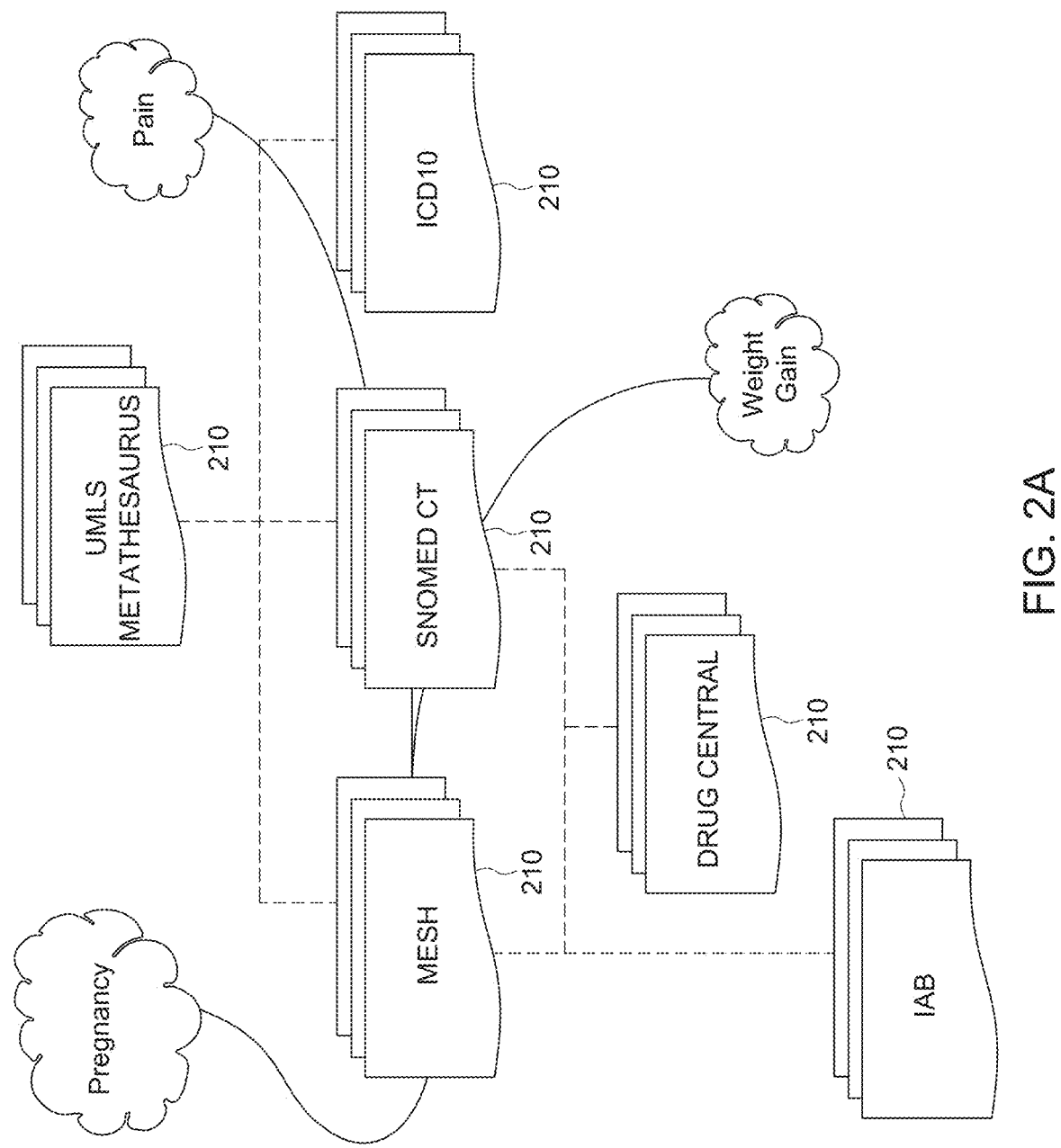
Figure 2B:
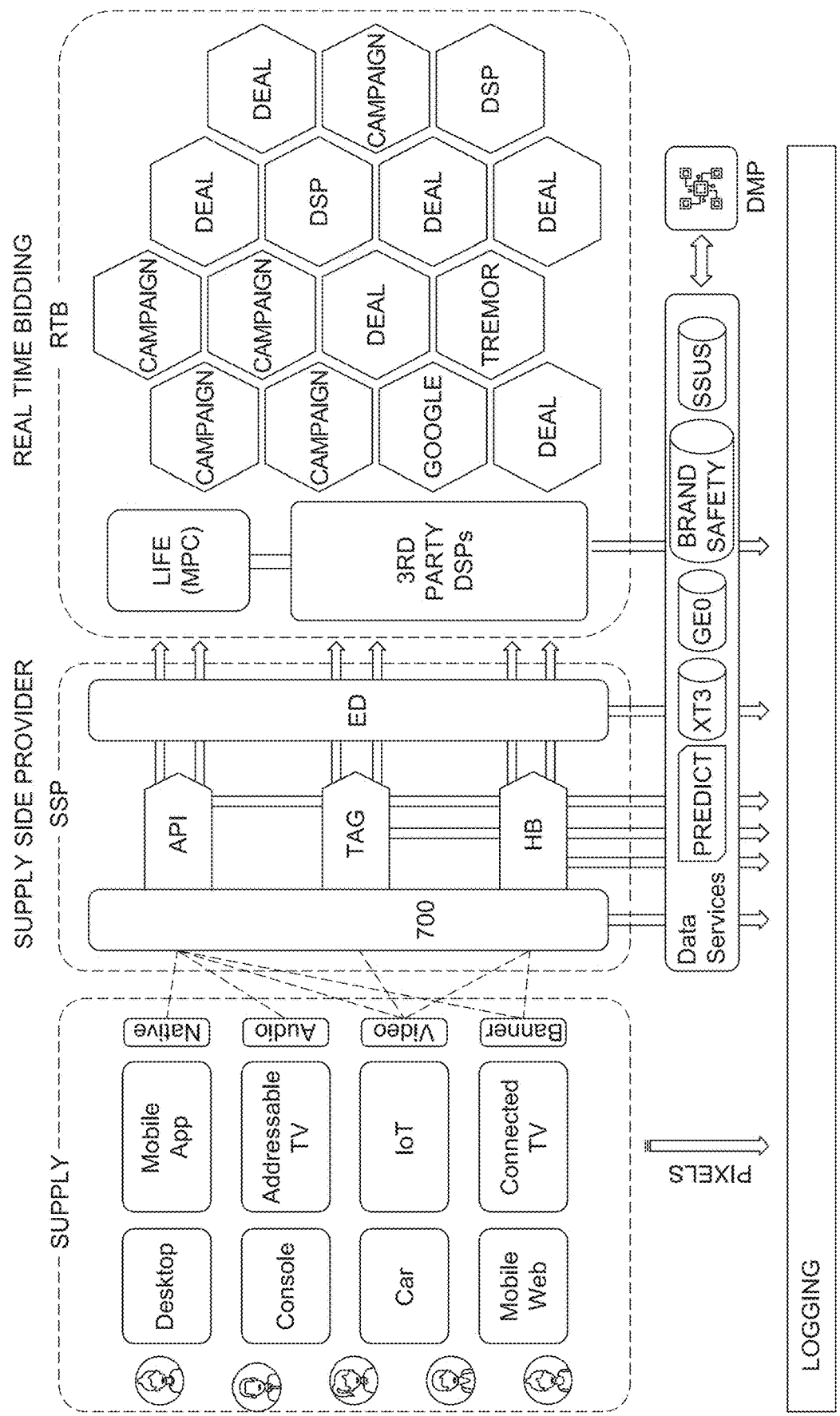
Figure 2C:
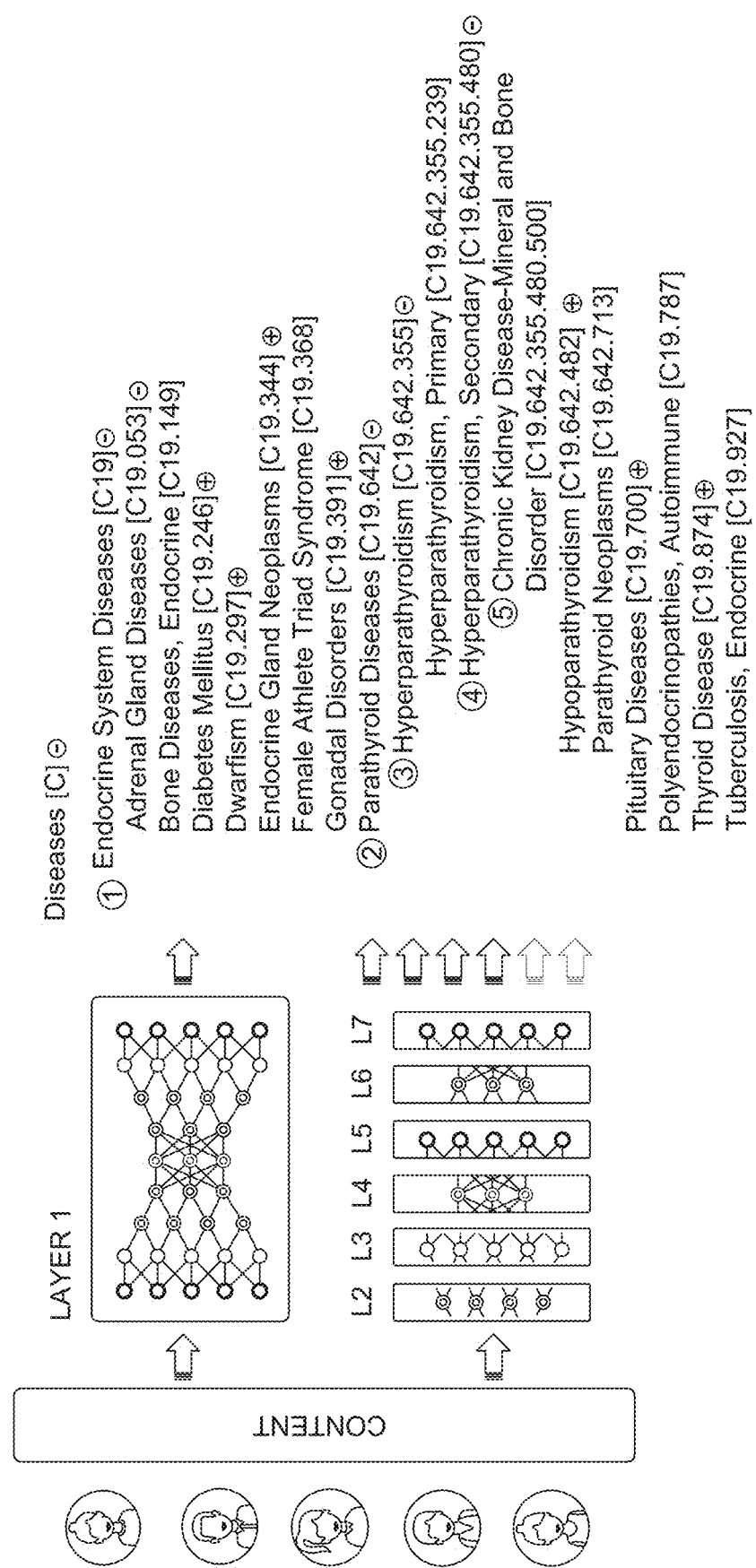

Referring to FIGS. 2A, in some professions, for example, physicians and other health care providers, a nationally-assigned ID, such as the NPI, provides a deterministic, validated linkage to a specific person. Likewise, in each state, attorneys, barbers and beauticians, and other professionals are assigned an ID number—the tuple of (state, profession, ID number) uniquely identifies a given person. Computer system 100 may use that fixed point as a central, known fact around which to triangulate information.

Additionally, computer system 100 may use various other indexes and existing taxonomic systems 210 to categorize information and correlate various data to each other. For example, in health care, SNOMED CT (a global standard for health terms to standardize clinical terminology), the Medical Subject Headings (MeSH, a controlled and hierarchically-organized vocabulary produced by the National Library of Medicine, originally designed for use for indexing, cataloging, and searching of biomedical and health-related information), the Unified Medical Language System (UMLS, a uniform index of terminology, classification and service coding, designed to promote interoperable biomedical information systems and services, including electronic health records), and ICD-10 (a set of classification codes for diseases, symptoms, abnormal findings, and causes) may be used to classify information. Computer system 100 may use one or more standard indexes as a uniform taxonomy for information, which allows inferences to be known with increased certainty.

Professionals in certain professions, such as healthcare professionals, typically have several clustered behaviors: (i) they consume specific kinds of subject matter content, and (ii) locations and IP addresses tend to be around facilities related to their professions. For example, doctors tend to interact with the internet from hospitals and medical arts buildings; lawyers tend to interact with the internet from courts and lawyer-oriented office buildings. Those two pieces of information allow computer system 100 to mine and refine typical onboarder information in order to resolve an identity to an individual professional.

Computer system 100 may consolidate information into a multilayer graph. Nodes of respective layers of the graph may be, for example:

Personal information from a known source, for example, the NPI record from CMS
various onboarder digital IDs
visit information obtained as a user visits various web sites, labeled with a medical condition from one of the taxonomic indexes The edges of the graph may indicate the strength of a correlation. For example, an edge between a digital ID and a visit may have a weight of 1.0 if a visit to that web site is unambiguously known to be from a visitor with that digital ID. Edges between a personal ID node and a digital ID may be labeled with a value between 0.0 and 1.0, depending on the level of certainty with which a correlation is known.

Referring again to FIGS. 1A and 1B, computer 100 may obtain data 162 from multiple onboarders. Each onboarder may provide different collections of information, organized differently. In addition, information may be available from a bid stream of advertising bids from an ad exchange. In addition, computer 100 may obtain a registry of people, for example the NPI registry 160 of physicians. Some of the records may record a single event, such a firing of a pixel, a website vise, an ad request, or initiation of a video, annotated with some form of identification numbers, such as an NPI number, a cookie value, an IP Address, one or more email addresses, etc. The collection of all onboarder information may be better and more reliable than any single record. The process of FIG. 1A may extract correlations to identify matches among the records.

In step 124, if (after data cleaning) the record has an NPI, then that may be considered conclusive.

In step 130, computer 100 inquires whether another digital ID (other than an NPI) has a matching digital ID 132, and whether the two records have further indicia of correlation. For example, if the records have the same 132 cookie value or device ID, or the same last name, and come from the same IP address, then they may be assumed to refer to the same person, and the NPI number of the matching record may be relied on.

If that fails to identify a match, then in step 140, from the matching digital ID (which could be a cookie ID, device ID, or third party or onboarder ID number), computer 100 may obtain a list of all associated IP addresses, filter out IP addresses that are not plausible (cell phone towers and the like) to filter down to IP addresses that have been consistent enough over time to likely correspond to the home or office of the user, and for which there are no conflicting data. Correlations may be evaluated over records from multiple sources, such as multiple onboarders, multiple ad exchanges, and the like, based on multiple dimensions (latitude and longitude, domain name of origin, user agent device type, consistency over successive days, etc.). From among these multi-parameter matches, the highest-consistency and highest-probability match may be identified. Factor weighting may be computed by an equation such as $$\int_i \text{weight}_i \times \text{dactor}_i$$

Weights for highly reliable data, such as NPI number for a record with the correct last name, may be high. Weights for data that may be shared by family members, office staff, etc. may be low. Examples include domain name, IP address, and cookie numbers. Weights may increase if multiple low-weight data are consistently appear correlated within multiple records. From those IP addresses, computer 100 may infer a correlation between the digital ID, IP address, and NPI number. Computer 100 may assume that all the data are noisy and contain errors, and rely on combinations of multiple matches before settling on a correlation among user ID and NPI number (or other personal identification number).

Referring again to FIG. 1B, one or more onboarders may provide a first level connection between visitors and digital IDs 162. The onboarder may provide a set of digital IDs, and give a tentative clustering or correlation indicating which digital IDs are likely the same person. However, the onboarder doesn't look at any personally-identifiable information (PII) and does not attempt to correlate digital IDs to PII. This preliminary clustering from the onboarder has errors of both overclustering (that is, correlating too many digital IDs together, in the belief that multiple people are the same person) and underclustering (where multiple digital IDs that are in fact the same person are not clustered, but instead reported to be different people).

Computer system 100 may obtain known-reliable PII information, for example, NPI information 160 from CMS. From that known-reliable information, computer system 100 overlays various digital location data, cell phone location data, office/practice location, and additional information as it becomes available, to develop confidence in inferred correlations between digital IDs and real life personal IDs. Various correlations may be used to expand those inferences.

- If multiple digital IDs tend to track each other geographically, computer system develops confidence that they represent the same person. For example, if a mobile phone, and several device IDs are usually observed in Seattle, and then all shift to Chicago for several days, then return to Seattle, then it can be inferred to some likelihood that the device IDs all belong to the same person, and that this person lives in Seattle.
- If device IDs that are clustered by the onboarder are simultaneously (or in close temporal proximity) are active in Seattle, Chicago, and New York, computer system 100 develops confidence that the digital IDs clustered by the onboarder are really several different people.
- Information about multiple digital IDs from multiple onboarders may be correlated to each other to validate the clustering of digital IDs, and to build confidence in clustering of digital IDs to personal IDs.
- The person's profession may be inferred from the pattern of web sites visited. For example, a person that regularly visits web sites directed to medical professionals (the Physician's Desk Reference (PDR), the National Institutes of Health's PubMed, specific medical journals, the FDA or CDC), as opposed to a consumer site like WebMD, is more likely to be a physician or health care professional. A person that regularly visits the web site of courts, or of lawyer-targeted web sites like Westlaw, may be inferred to be a lawyer. Visits to paid web sites are a stronger indicator than visits to free web sites.
- The person's specialty may be inferred from the pages visited. For a physician, a specialty like diabetes, cardiology, etc. may be inferred from the choice of articles. For a lawyer, specialty may be inferred from visiting web sites that specialize in one field, or from the specific articles read.
- The person's profession may also be inferred from IP address. A person that regularly visits web sites from the IP address of a hospital is more likely a physician or health care professional.
- The person's profession may be inferred from an email address associated with a digital ID. For example, if a digital ID has an associated email address for a hospital, that digital ID is more likely to be a medical professional.
- A person who regularly shows up on a WiFi or IP address the same as another person known to be a doctor is more likely a health care professional.

No one of these by itself is determinative of personal identification, correlation to other digital IDs, profession, or location. However, taken together, computer system 100 may develop confidence in its correlations and inferences. Some inquiries yield firm "no's," a definite noncorrelation. For example, two digital IDs that consistently come from different geographical locations at about the same time are definitely not the same person. Very few give definitive "yes" correlations; almost all are indicators that only point to correlation as aggregates.

II. NPI Scoring

Computer system 100 may validate digital IDs and NPI numbers to ensure accuracy. For example, Dr. Smith NPI number 0000111000 is registered in New York and practices in the New York metro area. Transactions with Dr. Smith are likely accurate if Dr. Smith is regularly identified in New York, New Jersey, Connecticut, with occasional excursions to Pennsylvania. However, if this digital ID is identified in Texas, California, Washington, and North Dakota on the same day, there's almost certainly an anomaly that needs correction. Possible causes for the anomaly include:

1. A mismatch between the IP address and the geographical location report
2. The physician NPI registry may have stale data—observationally, the NPI database has a 10-15% deviation from Zocdoc.com (an online medical care appointment booking service) or DRG
3. The onboarder may provide erroneous data
4. Incorrect emails
5. Cookies may be stale Computer system 100 may be programmed to recognize when the onboarder provides an anomalously high number of cookies or digital IDs for a cluster reported by the onboarder to correspond to a single person. Computer system 100 may be programmed to recognize when cookies or digital IDs are coming from an implausible set of geographic locations in a short period of time.

One possible query might read as follows:

```
select x. *, y. * from
( with raw as
    select
    day,
    npi,
    count (distinct vguid) as freq
        from thirdparty.dmd_info_aggregated
    where npi <>'' and day>='2020-01-01'
    group by 1, 2
),
std as
(
select day, stddev (freq) as standard_deviation,
    max (freq), avg (freq) as mean, appx_median(freq) as median
from raw
group by 1)
select
distinct npi,
case when freq<( std.mean) then 1
    when freq<( 50) then 0.5
    else 0 end as freq_score
from raw
left join std on std.day = raw. day ) x
left join
(select a.*, c.npi from
(
select temp.npihash, temp.paid,
case when region<6 then 1
case when region<6 then 1
    when region<11 then 0.75
    when region<16 then 0.45
    when region<21 then 0.1
    else 0 end as 'score'
```

```
           from
           (Select
              lower(regexp_extract(servednpi, '^(\ \w.*)\ \_(\ \w.*)$', 2) ) as
                 npihash,
              count ( distinct region) as region,
              sum ( impressions) as paid
              from mpc.mpcdatavault
              where day >='2020-01-09' and servednpi <>' '
              group by 1) temp
           ) a
           left join
           (select distinct npi, npihash from
              thirdparty.dmd_info_aggregated where day>='2019-10-01' ) c
              on c.npihash = a.npihash
           ) y
           on x.npi = y.npi
```

III. Correlating Offline PII to Cookie/Device Digital ID

Computer system 100 may use email addresses as a first clue to correlate digital ID to personal ID. For example, many health care data providers and have opt in email address(es). Data on-boarders often collect email addresses, and provide them correlated to their cookies/device IDs. Publishers may have first party data tying email addresses to cookies/device IDs. Data from the NPI database may include email addresses. While not a perfect indicator of an individual identity, email addresses are a datum that is a relatively high reliability clue.

Confounders that make email addresses a less-than-100% reliable indicator include:
- Obsolete email addresses, inaccurate email addresses (email addresses from some vendors are of questionable quality).
- Onboarding match algorithm may not be very good for very specific uses cases (for example, if a vendor did a match on first name, last name alone, that may cluster entirely unrelated "John Smiths" together, without further validation, which will lead to false clustering).
- Similar probabilistic matches with very low threshold and insufficient cross-validation on other parameters, which results in unreal number of digital identities for an NPI.
- Inaccurate cookies/device IDs create issues for attribution.

Computer system 100 may disambiguate false clusters by a series of heuristics to detect wrong matches between email address and individual identity, such as:
- (−) Exclude outlier digital ID to person correlations (roughly 1% of correlations received from onboarders and other vendors will be filtered out).
- (−) Exclude email addresses that appear in more than 20 states within a week
- (−) Exclude correlations between personal identity and cookie/device ID and email address where the apparent match between IP address and geographical location mismatches within a given day.
- (−) Exclude deactivated personal IDs (for example, if a physician retires, his/her NPI number is deactivated, which implies that all other correlations between digital ID and that NPI are false).

Once computer system 100 has excluded outliers based on unreliable data, the remaining cookies may be evaluated for likely correctness, or excluded cookies may be "rehabilitated" based on the following factors:

- (+) Include cookies of outlier NPIs when they are served in correct state
- (+) Include cookies based on DMA-region match. Example Greater NYC—(NY, NJ, CT, PA)
- (+) Consider conference schedules when doctors would congregate in one city (one state)

Referring to FIGS. 3A and 3B, for example, one daily sample of cookies per person received from onboarders and similar vendors may show that about 50% of all users have between 1-10 cookies per day, 25% between 11 and 20, 12% between 21-30, etc. which gives a mean of about 6 cookies per day, a median of 11, less than 1% of individuals have more than 70 cookies a day, and the max is about 3000 cookies per day. This maximum of 3000 cookies is more cookies than a real user could have, so these may be assumed to be spurious, and discounted from matching.

Likewise, referring to FIG. 3C, raw data from onboarders would show that the number of states in which a person appears in a week is that over 90% of users are limited to 1-5 states per week, about 5% are in 6-10, and fewer still in 11 or more states per week. Roughly 3% of individuals have served impressions in more than 10 states in a 7-day window. It is highly improbable that a person keeps traveling states to state to state in a given 7 day period. There are few cases where a device ID tagged to an individual had IP addresses mapped to multiple states in one single day.

The filtering of the previous paragraphs, based on very high number of cookies or high geographical dispersion, will over-filter. That is, some of those cookies and correlations to personal IDs are correct, and shouldn't be discarded. Cookies based on served impressions are more reliable than other inferred cookies, so computer system 100 may choose those to retain.

Geographic matching may include general metropolitan regions. For example, greater New York City may include New York, New Jersey, Connecticut, and eastern Pennsylvania. A physician who is licensed in New York may travel to a clinic in New Jersey, and that state border crossing should not lead to disqualification of identity matches.

Similarly, professionals often attend conferences that are held outside of their practice region. Calendars of conferences are published, for example, https://theconferencewebsite.com/conferences/endocrinology-and-diabetes, which can help identify travel that ought not block cookies

IV. GPS Data in Verifying Location of a User

Computer system 100 may receive data from multiple sources. Some sources may include information relating to the person's offline life and activities, others may include registration data, mailing lists and online data. A major source of online data is the advertising impressions coming from an advertising exchange that provides cookies, device IDs, and corresponding locations. This information may be obtained as part of a bid request for an ad to be served when a publisher's web page is displayed.

Computer system 100 may have programmed capabilities to resolve inconsistency and inaccuracies due to self reported data. For example, many of the data may report the geographic location of a data center from which a company operates its IT infrastructure or from which an ad is served, rather than the geographic location of the user. The location occasionally comes from GPS but often is derived from the IP Address associated with the bid request from the publisher, made bid from the advertiser or paid impression from the ad server. This location can be inaccurate which can lead to false positives or false negatives when computer system 100 or other computer systems make decisions about a given impression, device/cookie or user as a whole. This impacts the quality and scale of our solutions in both directions.

To reduce errors, computer system 100 may use triangulation of GPS data, offline data, and real time exchange data to overcome shortcomings of reliance on a single source.

During many web interactions, mobile devices and desktop devices generate triples of information:

(device ID, location (as latitude and longitude), time)

Computer system 100 may collect these triples as a reliable log of location and time for the device. For example, locations of a device (or at least uses of a device) may be plotted over the course of months for its high-frequency use, showing hot spots at the person's home, work, and a relatively small number of other locations and transit ways between, within the range of the person's daily commute. Over a longer time, or considering lower-frequency use over the same time period, may show other locations which may be due to travel. Those maps of location may be used to validate which messages and data samples are likely valid (and are to be weighed higher in an evaluation) and which are more likely to be discounted as spurious.

Computer system 100 may analyze these data to establish footprints around certain geographical areas. This may provide identification of typical locations of a user with higher confidence, and to identify outlier data points that are likely spurious. With the help of panel data (of the last X months), we can serve users with a high degree of confidence and also use this information in measurement and attribution.

IV.A. Validation Application

For some populations of users, publicly-available databases provide reliable information about users in that population. For example, CMS' NPI registry contains validated data about all registered health care professionals, including work and home address data. The NPI registry is not updated instantaneously to reflect every move, so it often contains stale data. Data from the NPI registry can be further validated with GPS data to validate locations of users. Data may be further validated, as described in U.S. application Ser. No. 16/986,206, Validation of Properties of a User Device in a Network, filed Aug. 5, 2020, incorporated by reference.

GPS data are generally the most reliable location data source. Real time data derived from other sources could be inaccurate, which reduces reliability for uses such as content targeting and measurement. However, in some application areas, only 11% of interactions with a user include GPS-derived location data.

Ad bid data received from ad exchanges may be less reliable, since it tends to be self-reported, or to reflect attributes of a data center rather than a user. Computer system 100 may use GPS and other offline data to verify bid request data, to improve confidence in location identification.

IV.B. Real Time Targeting Using Triangulation of GPS, Offline, and Real Time Exchange Data For a given web site interaction, computer system 100 may receive a data package with the following data:
a known identification of a specific person, for example, the NPI of a health care provider
One or more cookie values $V_1$, $V_2$ and a device ID D,
A location at the time of the interaction, based on GPS data $L_{GPS}$, location based on other offline data $L_{offline}$, or location data from an ad exchange $L_{exchange}$ At time $T_0$, the best location data available in real time may be the correlation of $L_{exchange}$ to cookie values $V_1$, $V_2$.

At a later time $T_1$, computer system 100 may have further location data, including offline and exchange data. If values for $L_{offline}$ and $L_{exchange}$ differ substantially, computer system 100 may perform a distance calculation between two. If the distance between the two exceeds some threshold, computer system 100 may conclude that both are unreliable. The appropriate action may be to take no action. Computer system 100 may move on to further heuristics to choose some action, or may decline to take any action and move on to some next user.

At a still later time $T_2$, computer system 100 may have all three, Data source and $L_{GPS}$ derived from longitudinal data get preference over $L_{offline}$ and $L_{exchange}$ V. Keyword Expansion per Condition An algorithm may generate a list of keywords that are associated with a particular medical condition that users can use for keyword targeting. For various medical conditions, the MeSH taxonomy gives us some words that are very tightly related to the condition. We then scour the internet for web pages written about the condition and look for words that uniquely appear in articles about that condition. In some cases, those keywords are highly clustered within that set and rarely occur outside the set.

VI. Computer Implementation

Various processes described herein may be implemented by appropriately programmed general purpose computers, special purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes.

Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

For clarity of explanation, the above description has focused on a representative sample of all possible embodiments, a sample that teaches the principles of the invention and conveys the best mode contemplated for carrying it out. The invention is not limited to the described embodiments. Well known features may not have been described in detail to avoid unnecessarily obscuring the principles relevant to the claimed invention. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed alternatives, variations, modifications, and equivalents are within the literal scope of the following claims, and others are equivalent. The claims may be practiced without some or all of the specific details described in the specification. In many cases, method steps described in this specification can be performed in different orders than that presented in this specification, or in parallel rather than sequentially, or in different computers of a computer network, rather than all on a single computer.

The invention claimed is:

1. A method, comprising the steps of:
   at a computer, obtaining records of multiple digital events from multiple vendors of digital event records, each digital event record having a digital ID of a user that initiated the respective digital event;
   at the computer, obtaining at least one list of professional registry numbers of professionals in a profession;
   by the computer, classifying at least some portion of the digital event records and at least some internet web pages based on a standard taxonomical index;
   by the computer, identifying correlated identification data points among the digital event records and the professional registry records, and based on the taxonomic classification of pages and digital events, to infer a correlation between digital IDs from digital event records and actual physical identities of physical persons, and computing a parameter reflecting a degree of certainty of the inference.

2. The method of claim 1, wherein:
   the correlating considers at least three of a cookie value from a user's browser, IP address, user ID assigned by an onboarder, mobile device ID, mobile phone number, and email address.

3. The method of claim 2, wherein:
   the correlating considers at least four of a cookie value from a user's browser, IP address, user ID assigned by an onboarder, mobile device ID, mobile phone number, and email address.

4. The method of claim 1, wherein:
   the identification of correlation includes identifying multiple digital IDs assigned by multiple sources that correspond, to high probability, to a single, identifiable individual.

5. The method of claim 1,
   wherein the list of professional registry numbers includes the NPI (National Provider ID) assigned by CMS (the Center for Medicare & Medicaid Services).

6. The method of claim 1,
   wherein the web pages and digital events are taxonomically classified under at least two of SNOMED CT, the Medical Subject Headings (MeSH), the Unified Medical Language System (UMLS), and International Classification of Diseases (ICD).

7. A method, comprising the steps of:
   at a computer, obtaining records of multiple digital events from multiple vendors of digital event records, each digital event record having a digital ID of a user that initiated the respective digital event;
   at the computer, obtaining at least one list of professional registry numbers of professionals in a profession;
   by the computer, classifying at least some portion of the digital event records and at least some internet web pages based on a standard taxonomical index; and
   by the computer, identifying correlated identification data points among the digital event records and the professional registry records, and based on the taxonomic classification of pages and digital events, to infer a correlation between digital IDs from digital event records and actual physical identities of physical persons, and computing a parameter reflecting a degree of certainty of the inference.

8. The method of claim 7, wherein:
   the identifying and inferring of correlation consider at least three of a cookie value from a user's browser that initiated a one of the digital event records, IP address of a visitor for a one of the digital event records, user ID assigned by an onboarder, mobile device ID of a visitor for a one of the digital event records, mobile phone number of a visitor for a one of the digital event records, and email address of a visitor for a one of the digital event records.

9. The method of claim 8, wherein:
   the identifying and inferring of correlation consider at least four of a cookie value from a user's browser that initiated a one of the digital event records, IP address of a visitor for a one of the digital event records, user ID assigned by an onboarder, mobile device ID of a visitor for a one of the digital event records, mobile phone number of a visitor for a one of the digital event records, and email address of a visitor for a one of the digital event records.

10. The method of claim 7, wherein:
the identifying and inferring of correlation include identifying multiple digital IDs assigned by multiple sources that correspond, to high probability, to a single, identifiable individual.

11. The method of claim 7,
wherein the list of professional registry numbers includes the NPI (National Provider ID) assigned by CMS (the Center for Medicare & Medicaid Services).

12. The method of claim 7,
wherein the web pages and digital events are taxonomically classified under at least two of SNOMED CT, the Medical Subject Headings (MeSH), the Unified Medical Language System (UMLS), and International Classification of Diseases (ICD).

13. A apparatus, comprising:
one or more processors;
a machine readable, nontransitory memory, having stored therein instructions programmed to cause the one or more processors to:
  obtain records of multiple digital events from multiple vendors of digital event records, each digital event record having a digital ID of a user that initiated the respective digital event;
  obtain at least one list of professional registry numbers of professionals in a profession;
  classify at least some portion of the digital event records and at least some internet web pages based on a standard taxonomical index; and
  identify correlated identification data points among the digital event records and the professional registry records, and based on the taxonomic classification of pages and digital events, to infer a correlation between digital IDs from digital event records and actual physical identities of physical persons, and computing a parameter reflecting a degree of certainty of the inference.

14. The apparatus of claim 13, wherein:
the identifying and inferring of correlation consider considers at least three of a cookie value from a user's browser that initiated a one of the digital event records, IP address of a visitor for a one of the digital event records, user ID assigned by an onboarder, mobile device ID of a visitor for a one of the digital event records, mobile phone number of a visitor for a one of the digital event records, and email address of a visitor for a one of the digital event records.

15. The apparatus of claim 14, wherein:
the identifying and inferring of correlation consider at least four of a cookie value from a user's browser that initiated a one of the digital event records, IP address of a visitor for a one of the digital event records, user ID assigned by an onboarder, mobile device ID of a visitor for a one of the digital event records, mobile phone number of a visitor for a one of the digital event records, and email address of a visitor for a one of the digital event records.

16. The apparatus of claim 13, wherein:
the identifying and inferring of correlation consider includes identifying multiple digital IDs assigned by multiple sources that correspond, to high probability, to a single, identifiable individual.

17. The apparatus of claim 13,
wherein the list of professional registry numbers includes the NPI (National Provider ID) assigned by CMS (the Center for Medicare & Medicaid Services).

18. The apparatus of claim 13,
wherein the web pages and digital events are taxonomically classified under at least two of SNOMED CT, the Medical Subject Headings (MeSH), the Unified Medical Language System (UMLS), and International Classification of Diseases (ICD).

\* \* \* \* \*